No. 717,954. PATENTED JAN. 6, 1903.
J. M. VAUGHAN.
FILTER.
APPLICATION FILED MAR. 29, 1902.
NO MODEL.
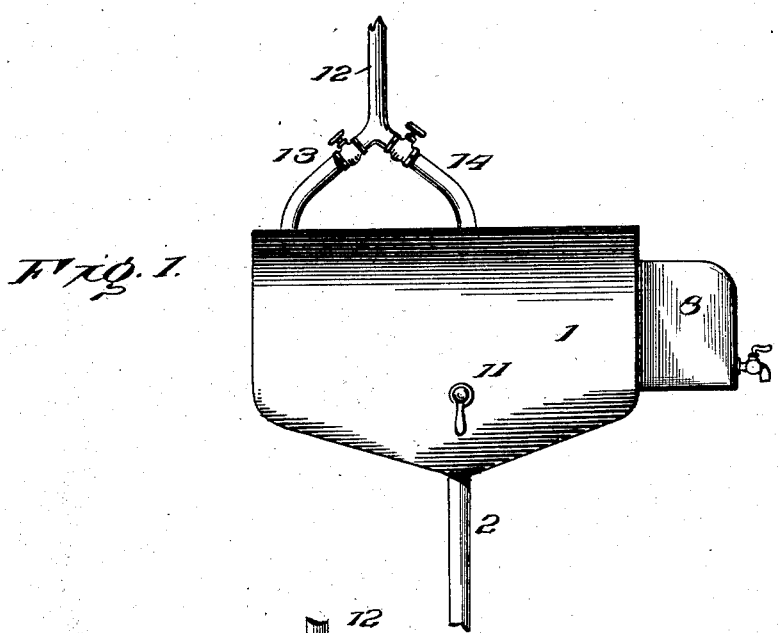
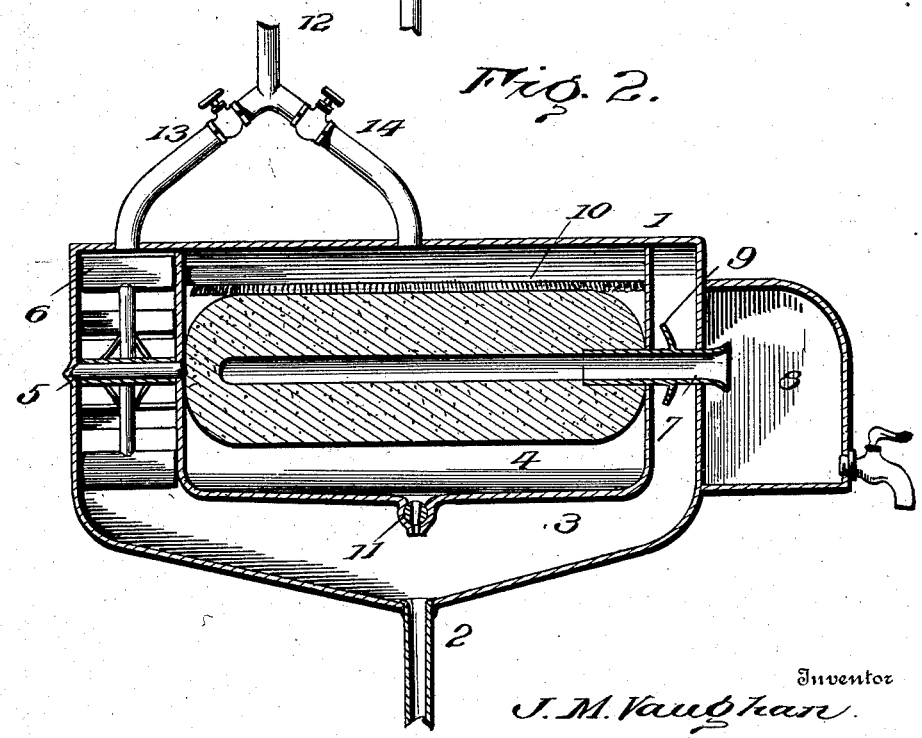

UNITED STATES PATENT OFFICE.

JAMES M. VAUGHAN, OF OWENSBORO, KENTUCKY.

FILTER.

SPECIFICATION forming part of Letters Patent No. 717,954, dated January 6, 1903.

Application filed March 29, 1902. Serial No. 100,614. (No model.)

*To all whom it may concern:*

Be it known that I, JAMES M. VAUGHAN, a citizen of the United States, residing at Owensboro, in the county of Daviess and State of Kentucky, have invented certain new and useful Improvements in Filters; and I do hereby declare the following to be a full, clear, and exact description of the invention, such as will enable others skilled in the art to which it appertains to make and use the same.

This invention has for its object the provision of simple and effective means for purifying water for drinking and cooking purposes and which will be self-cleaning, thereby insuring an ample supply of pure and wholesome water without the annoyance and inconvenience experienced with the use of filters requiring manual manipulation for cleaning the filtering medium.

In its organization the apparatus comprises a tank for reception of the water to be purified, a casing inclosing said tank and of a size to leave a space between corresponding walls, a filter located in the tank and mounted for rotation, a receptacle at one end of the casing and adapted to receive the filtered water from the filter, a cleaner located in the said tank and touching the filter, so as to remove all impurities adhering thereto, and a motor-wheel at one end of the casing and exterior to the aforementioned tank and connected with the filter to impart rotation thereto automatically, said motor-wheel being operated by a jet of water supplied thereto by means of a branch from the distributing-pipe.

The invention consists, essentially, of the structural details and novel features and combinations of parts, which hereinafter will be more particularly set forth, illustrated, and finally claimed.

In the drawings hereto attached and forming a part of the specification, Figure 1 is a side view of a filtering apparatus embodying the invention. Fig. 2 is a vertical central section thereof.

Corresponding and like parts are referred to in both views of the drawings and indicated in the following description by the same reference characters.

The casing 1 is oblong and horizontally arranged and its bottom slopes downward to a central point, with which communicates a waste-pipe 2. A tank 3 is located in the casing 1 and is spaced therefrom. A filter 4 of cylindrical form is located in the tank 3 and mounted for rotation about a horizontal axis. The filter 4 may be of any formation and is preferably a stone having its central portion bored. A shaft 5 is secured to one end of the filter 4 and is journaled in adjacent ends of the casing 1 and tank 3 and receives the motor-wheel 6 of any desired type. A short tube 7 is fitted into the bore or opening at the opposite end of the filter and obtains a bearing in the opposite adjacent ends of the casing and tank. The outer end of the tube 7 flares and enters the upper portion of a receptacle 8 at the end of the casing for containing the filtered water. A flange or collar 9 is applied to the portion of the tube 7 extended across the space formed between the adjacent ends of the tank 3 and casing 1 and prevents any water leaking from the tank following the pipe 7 into the receptacle 8.

A cleaner 10 of any construction is located in the upper portion of the tank 3 and is adapted to bear lightly against the outer side of the filter 4, so as to remove impurities therefrom in the rotation of the filter. The bottom of the tank 3 slopes to a central point, at which is located a valve 11, adapted to be operated from the outside of the casing to admit of sediment passing off from the tank into the casing, thence to the point of discharge by means of the waste-pipe 2. The distributing-pipe 12 has valved branches 13 and 14, the latter leading into the tank 3 and the former communicating with the casing 1 and arranged to deliver a jet upon the motor-wheel 6, whereby the filter 4 is rotated against the cleaner 10, whereby all impurities are removed therefrom. When the valve controlling the branch 13 is closed, the water is cut off from the motor-wheel 6 and the filter 4 remains stationary; but when water is permitted to flow through the pipe 13 the motor-wheel is actuated and the filter 4 rotated, thereby automatically cleaning the same by means of the part 10. By having the tank 3 located in the casing 1 any water escaping therefrom through the bearings in the ends of the tank is received in the casing, thereby preventing dripping upon the floor or other place.

Having thus described the invention, what is claimed as new is—

1. In a filter, the combination of a casing, a tank arranged within the casing and having its walls spaced therefrom, a filter journaled in corresponding end walls of the tank and casing, a receptacle at one end of the casing and exterior thereto for receiving the filtered water, a motor-wheel fitted to the journal of the filter remote from the said receptacle and located wholly within the space formed between adjacent end walls of the casing and tank, a stationary cleaner within the upper portion of the tank, and a supply-pipe having branches, one leading into the tank and the other into the casing, substantially as described.

2. A filter comprising a tank having a valve-controlled opening in its bottom portion, a fixed cleaner in the upper portion of the tank, a casing enveloping the tank and spaced therefrom and having its bottom sloping and provided with a waste, a receptacle at one end of the casing and exterior thereto for receiving the filtered water, a filter located within the tank and journaled in corresponding end walls of the tank and casing, the journal at the delivery end of the filter being tubular and extending into the said receptacle, a guard applied to the tubular journal between its bearing-points and arranged in the space formed between the end walls of the tank and casing, a motor-wheel applied to the opposite journal of the filter and located in the space between the opposite end walls of the tank and casing, and a supply-pipe having branches extended into, respectively, the casing and tank, the waste-water from the motor-wheel having a direct escape through the casing, substantially as specified.

In testimony whereof I affix my signature in presence of two witnesses.

JAMES M. VAUGHAN. [L. S.]

Witnesses:
ROLLA R. HAYS,
MARCUS C. STUART.